US012470018B2

(12) United States Patent
Vander Till et al.

(10) Patent No.: US 12,470,018 B2
(45) Date of Patent: Nov. 11, 2025

(54) TAMPER RESISTANT ELECTRICAL OUTLET

(71) Applicant: Norman R. Byrne, Ada, MI (US)

(72) Inventors: Gerald N. Vander Till, Grandville, MI (US); Roger J. Barr, Lowell, MI (US)

(73) Assignee: Norman R. Byrne, Ada, MI (US)

( * ) Notice: Subject to any disclaimer, the term of this patent is extended or adjusted under 35 U.S.C. 154(b) by 339 days.

(21) Appl. No.: 18/057,514

(22) Filed: Nov. 21, 2022

(65) Prior Publication Data

US 2023/0163524 A1 May 25, 2023

Related U.S. Application Data

(60) Provisional application No. 63/282,884, filed on Nov. 24, 2021.

(51) Int. Cl.

| | |
|---|---|
| ***H01R 13/631*** | (2006.01) |
| ***H01R 13/05*** | (2006.01) |
| ***H01R 24/78*** | (2011.01) |

(52) U.S. Cl.

CPC ........... *H01R 13/631* (2013.01); *H01R 13/05* (2013.01); *H01R 24/78* (2013.01)

(58) Field of Classification Search

CPC ...... H01R 13/631; H01R 13/05; H01R 24/78; H01R 2103/00; H01R 13/7036; H01R 13/4534; H01R 24/22

See application file for complete search history.

(56) References Cited

U.S. PATENT DOCUMENTS

| | | | |
|---|---|---|---|
| 2,477,803 | A | 8/1949 | Huber |
| 2,528,014 | A | 10/1950 | Moses, Jr. et al. |
| 2,610,999 | A | 9/1952 | Silver |
| 2,740,943 | A | 4/1956 | Young |
| 2,770,786 | A | 11/1956 | Czyzewski |
| 2,826,652 | A | 3/1958 | Piplack |
| 3,222,631 | A | 12/1965 | Cohen |

(Continued)

FOREIGN PATENT DOCUMENTS

| | | |
|---|---|---|
| CN | 2449374 Y | 9/2001 |
| CN | 2603548 Y | 11/2004 |

(Continued)

*Primary Examiner* — Jean F Duverne

(74) *Attorney, Agent, or Firm* — Gardner, Linn, Burkhart & Ondersma LLP

(57) ABSTRACT

A tamper resistant electrical outlet maintains its electrical contacts in a non-energized state until an object is inserted into an outlet opening for a different electrical contact. In this way, an object contacting the electrical contact behind one contact opening will not be subjected to electrical current unless another object is simultaneously inserted sufficiently far into another outlet opening. Insertion of an object, such as the prong of an electrical plug, into either outlet opening will move an actuator, thereby moving a respective live contact toward the electrical contact that is associated with the other outlet opening. Although the electrical outlet does not preclude objects from being inserted into its outlet openings and engaging the associated electrical contacts, only by simultaneous insertion of two different objects (such as two prongs of an electrical plug) into the different outlet openings will the electrical contacts become energized.

20 Claims, 10 Drawing Sheets

(56) References Cited

U.S. PATENT DOCUMENTS

| | | | |
|---|---|---|---|
| 3,238,492 | A | 3/1966 | Houston |
| 3,601,758 | A | 8/1971 | Davidsson |
| 3,736,547 | A | 5/1973 | Koenig |
| 4,094,569 | A | 6/1978 | Dietz |
| 4,168,104 | A | 9/1979 | Buschow |
| 4,379,607 | A | 4/1983 | Bowden, Jr. |
| 4,493,517 | A | 1/1985 | Hillary |
| 4,544,219 | A | 10/1985 | Barkas |
| 4,584,430 | A | 4/1986 | Belknap |
| 4,722,693 | A | 2/1988 | Rose |
| 4,822,290 | A | 4/1989 | Cauley et al. |
| 4,867,694 | A | 9/1989 | Short |
| 5,006,075 | A | 4/1991 | Bowden, Jr. |
| 5,011,419 | A | 4/1991 | Maan |
| 5,020,997 | A | 6/1991 | Calderara et al. |
| 5,069,630 | A | 12/1991 | Tseng et al. |
| 5,267,870 | A | 12/1993 | Maresh |
| 5,281,156 | A | 1/1994 | Yi |
| 5,374,199 | A | 12/1994 | Chung |
| 5,518,132 | A | 5/1996 | Chen |
| 5,839,909 | A | 11/1998 | Calderara et al. |
| 5,865,635 | A | 2/1999 | Hsiang et al. |
| 5,915,981 | A | 6/1999 | Mehta |
| 5,928,019 | A | 7/1999 | Chen et al. |
| 6,056,564 | A | 5/2000 | Huang |
| 6,086,391 | A | 7/2000 | Chiu |
| 6,111,210 | A | 8/2000 | Allison |
| 6,146,160 | A | 11/2000 | Chang |
| 6,149,446 | A | 11/2000 | Yu |
| 6,217,353 | B1 | 4/2001 | Yu-Tse |
| 6,224,401 | B1 | 5/2001 | Yu |
| 6,238,224 | B1 | 5/2001 | Shao |
| 6,310,306 | B1 | 10/2001 | Norling |
| 6,332,781 | B1 | 12/2001 | Ito |
| 6,394,826 | B1 | 5/2002 | Baxter et al. |
| 6,422,880 | B1 | 7/2002 | Chiu |
| 6,455,789 | B1 | 9/2002 | Allison |
| 6,537,088 | B2 | 3/2003 | Huang |
| 6,537,089 | B1 | 3/2003 | Montague |
| 6,555,771 | B2 | 4/2003 | Shao |
| 6,739,887 | B1 | 5/2004 | Yu |
| 6,753,755 | B2 | 6/2004 | Montague |
| 6,767,228 | B2 | 7/2004 | Katz |
| 6,776,630 | B1 | 8/2004 | Huang |
| 6,786,744 | B1 | 9/2004 | Lee |
| 6,786,745 | B1 | 9/2004 | Huang |
| 6,814,594 | B1 | 11/2004 | Huang |
| 6,893,275 | B2 | 5/2005 | Ng et al. |
| 6,932,631 | B2 | 8/2005 | Huang |
| 6,943,297 | B2 | 9/2005 | Capella |
| 6,969,801 | B2 | 11/2005 | Radosavljevic et al. |
| 7,114,968 | B2 | 10/2006 | Healy |
| 7,179,992 | B1 | 2/2007 | Packard et al. |
| 7,214,101 | B1 | 5/2007 | Tong |
| 7,312,394 | B1 | 12/2007 | Weeks et al. |
| 7,312,963 | B1 | 12/2007 | Radosavljevic et al. |
| 7,355,117 | B2 | 4/2008 | Castaldo et al. |
| 7,438,567 | B2 | 10/2008 | Nalwad et al. |
| 7,452,221 | B1 | 11/2008 | Oddsen et al. |
| 7,455,538 | B2 | 11/2008 | Germain |
| 7,510,412 | B1 | 3/2009 | Valentin |
| 7,537,468 | B1 | 5/2009 | Huang et al. |
| 7,551,047 | B2 | 6/2009 | Sokolow et al. |
| 7,554,033 | B1 | 6/2009 | Bhosale et al. |
| 7,556,513 | B2 | 7/2009 | Ng et al. |
| 7,588,447 | B1 | 9/2009 | Ni |
| 7,633,009 | B1 | 12/2009 | Baldwin |
| 7,637,756 | B1 | 12/2009 | Hsu |
| 7,641,489 | B1 | 1/2010 | Hsu et al. |
| 7,642,457 | B2 | 1/2010 | Weeks et al. |
| 7,645,148 | B2 | 1/2010 | Carbone et al. |
| 7,645,149 | B2 | 1/2010 | Carbone et al. |
| 7,651,347 | B2 | 1/2010 | Germain et al. |
| 7,651,348 | B2 | 1/2010 | Huang et al. |
| 7,695,293 | B1 | 4/2010 | Sikes |
| 7,722,389 | B2 | 5/2010 | Benoit et al. |
| 7,753,700 | B2 | 7/2010 | Ma |
| 7,790,982 | B2 | 9/2010 | Weeks et al. |
| 7,820,909 | B2 | 10/2010 | Castaldo et al. |
| 7,833,030 | B1 | 11/2010 | Huang |
| 7,868,719 | B2 | 1/2011 | Bazayev et al. |
| 7,869,171 | B2 | 1/2011 | Weeks et al. |
| 7,883,346 | B2 | 2/2011 | Huang |
| 7,887,346 | B1 | 2/2011 | Huang |
| 7,887,349 | B1 | 2/2011 | Macomber |
| 7,914,307 | B1 | 3/2011 | Yang |
| 7,934,935 | B1 | 5/2011 | Gao |
| 7,938,676 | B1 | 5/2011 | Patel et al. |
| 7,942,681 | B2 | 5/2011 | Ni |
| 7,985,085 | B2 | 7/2011 | Gao |
| 7,997,925 | B2 | 8/2011 | Lam et al. |
| 8,007,296 | B2 | 8/2011 | Chen et al. |
| 8,044,299 | B2 | 10/2011 | Weeks |
| 8,062,072 | B2 | 11/2011 | Ziobro |
| 8,063,303 | B1 | 11/2011 | McBain |
| 8,100,705 | B2 | 1/2012 | Chen et al. |
| 8,105,094 | B2 | 1/2012 | Patel et al. |
| 8,147,260 | B2 | 4/2012 | Huang |
| 8,187,011 | B1 | 5/2012 | Baldwin et al. |
| 8,187,012 | B1 | 5/2012 | Baldwin et al. |
| 8,193,445 | B2 | 6/2012 | Li |
| 8,202,104 | B2 | 6/2012 | Wang |
| 8,242,362 | B2 | 8/2012 | Castaldo et al. |
| 8,297,990 | B2 | 10/2012 | Huang |
| 8,366,463 | B2 | 2/2013 | Zhang et al. |
| 8,382,497 | B2 | 2/2013 | Huang |
| 8,435,055 | B1 | 5/2013 | Bhosale |
| 8,462,006 | B2 | 6/2013 | Chen |
| 8,465,305 | B2 | 6/2013 | Wilkie et al. |
| 8,480,415 | B2 | 7/2013 | Byrne |
| 8,480,420 | B2 | 7/2013 | Ziobro |
| 8,491,319 | B1 | 7/2013 | Baldwin et al. |
| 8,523,599 | B2 | 9/2013 | Lazzaro |
| 8,550,829 | B2 | 10/2013 | Huang |
| 8,562,362 | B2 | 10/2013 | Jiang et al. |
| 8,568,152 | B1 | 10/2013 | Weeks |
| 8,616,904 | B1 | 12/2013 | Martin et al. |
| 8,632,347 | B2 | 1/2014 | Chen et al. |
| 8,632,348 | B2 | 1/2014 | Baldwin et al. |
| 8,672,695 | B2 | 3/2014 | Baldwin et al. |
| 8,772,655 | B2 | 7/2014 | Lee |
| 9,059,530 | B2 | 6/2015 | Byrne et al. |
| 9,692,189 | B2 | 6/2017 | Lin |
| 10,038,283 | B2 | 7/2018 | Oddsen |
| 10,985,490 | B1 | 4/2021 | Ding et al. |
| 2004/0203270 | A1 | 10/2004 | Wang |
| 2009/0286411 | A1 | 11/2009 | Bazayev et al. |
| 2010/0159722 | A1 | 6/2010 | Chen |
| 2011/0263145 | A1 | 10/2011 | Kim |
| 2012/0170292 | A1 | 7/2012 | Bhosale et al. |
| 2012/0287572 | A1 | 11/2012 | Huang |
| 2013/0141822 | A1 | 6/2013 | Weeks et al. |
| 2016/0087368 | A1* | 3/2016 | Bazayev ............ H01R 13/4534 439/93 |
| 2016/0261078 | A1 | 9/2016 | Sandel |
| 2016/0326773 | A1* | 11/2016 | Tobias ................ E05B 27/0003 |
| 2020/0014141 | A1* | 1/2020 | Mozdzer ............ H01R 13/4534 |

FOREIGN PATENT DOCUMENTS

| | | | |
|---|---|---|---|
| CN | 2681385 | Y | 2/2005 |
| CN | 201038495 | Y | 3/2008 |
| CN | 105576418 | A | 5/2016 |
| GB | 2068651 | | 8/1981 |
| JP | 07065889 | A | 3/1995 |
| JP | 2006040733 | A | 2/2006 |
| KR | 10-2011-0134778 | | 12/2011 |
| KR | 101511035 | B1 | 4/2015 |
| RU | 2125329 | C1 | 1/1999 |
| WO | 2013086989 | | 6/2013 |
| WO | 2017017318 | | 2/2017 |
| WO | 2020129090 | | 6/2020 |

* cited by examiner

TAMPER RESISTANT ELECTRICAL OUTLET

CROSS REFERENCE TO RELATED APPLICATION

The present application claims the benefit of U.S. provisional application Ser. No. 63/282,884, filed Nov. 24, 2021, which is hereby incorporated herein by reference in its entirety.

FIELD OF THE INVENTION

The present invention relates to electrical receptacles and, more particularly, to electrical receptacles that, typically for safety reasons, block or limit undesired access to electrical contacts that are contained within the receptacles.

BACKGROUND OF THE INVENTION

Electrical receptacles or outlets, such as 110V AC or 220V AC simplex or duplex outlets or the like, are typically designed to receive at least two or three conductive prongs of an electrical plug associated with an electrical consumer, such as an appliance. The electrical receptacles have openings that receive respective prongs of an electrical plug, and have female electrical contacts spaced behind the openings, but the receptacle openings are typically too small (and the electrical contacts spaced too far rearwardly) for children's fingers or many common household objects to be inserted. However, paperclips, small screwdrivers, nails, and many other common objects are both electrically conductive and sufficiently small to pass through the openings and come into conductive contact with the electrical contacts of a typical electrical receptacle, which presents a risk of electrical shock, particularly for children or persons unfamiliar with (or unable to fully comprehend) the risks associated with electrical outlets and contact with electrical current.

Many access-restricting electrical outlets have been developed which block the insertion of objects into one or more outlet openings unless appropriately-sized objects (such as two prongs of an electrical plug) are inserted simultaneously. This causes a slider or other access-blocking structure to move aside and provide access to the live electrical contacts located behind the access-blocking structure. However, access-restricting electrical outlets typically provide higher resistance to plug-insertion in order to move the access-blocking structure laterally in response to perpendicular insertion force. They can also be prone to wear from excessive use, and can be prone to damage from high insertion forces of misaligned plugs.

SUMMARY OF THE INVENTION

The present invention provides a tamper-resistant electrical outlet that limits access to live electrical contacts by maintaining those electrical contacts in a non-energized state by default. Each electrical contact is energized once a compatible object, such as a prong of a proper electrical plug, has been inserted into an outlet opening associate with a different electrical contact. For example, in an electrical outlet having line ("hot") and neutral contacts positioned behind line ("hot") and neutral outlet openings, the line contact is only made "live" (i.e., electrically connected to a line supply conductor) when an object (e.g., a neutral plug prong) is inserted sufficiently far into the neutral outlet opening. Likewise, the neutral contact is only made live (i.e., electrically connected to a neutral supply conductor) when an object (e.g., a line plug prong) is inserted sufficiently far into the line outlet opening. Therefore, internal structures of the tamper-resistant electrical outlet do not preclude or prevent access to the internal electrical receptacle contacts, but instead provide enhanced safety by maintaining each electrical contact in a non-energized state until an object is inserted sufficiently far into a different electrical contact's opening. The tamper-resistant electrical outlet does not rely on access-blocking structures, but instead relies on selective energizing of the electrical contacts to provide enhanced electrical safety. The resulting outlet thus operates in a manner that is substantially indistinguishable from a conventional electrical outlet, and is not as susceptible to wear or damage from high insertion forces as is a typical access-restricting electrical outlet.

According to one form of the present invention, a tamper resistant electrical outlet includes a receptacle body with first and second receptacle contacts mounted therein, behind first and second outlet openings in a face of the body. First and second live contacts are also mounted in the receptacle body, and are designed to be continuously energized by respective conductors, such as wires from an electrical mains source. First and second actuators are mounted in the receptacle body and are configured to selectively and independently urge respective live contacts toward respective receptacle contacts in order to establish an electrical connection from the live conductors and contacts to the receptacle contacts. The live contacts are movable with respect to the receptacle contacts, and in a default position the live contacts are spaced apart from the receptacle contacts. The first live contact is configured to engage and electrically energize the first receptacle contact in response to insertion of an object through the second outlet opening in a manner that engages and moves the first actuator. The second live contact is configured to engage and electrically energize the second receptacle contact in response to insertion of an object through the first outlet opening in a manner that engages and moves the second actuator.

Thus, the tamper resistant electrical outlet of the present invention restricts access to live electrical contacts by maintaining the electrical contacts in a non-energized state by default, and only energizing a given contact once an object is inserted sufficiently far into a different contact's opening. Inserting a small conductive object such as a paperclip or a small screwdriver into a first outlet opening and into engagement with an associated first electrical contact, will not by itself cause the small conductive object to become electrically energized. Only upon insertion of another object into a second outlet opening would the first electrical contact be electrically energized.

These and other objects, advantages, purposes and features of the present invention will become apparent upon review of the following specification in conjunction with the drawings.

DESCRIPTION OF THE PREFERRED EMBODIMENTS

A tamper resistant electrical outlet provides electrical power, typically 110V AC or 220V AC power, to appliances, lighting, or other electrical consumers that utilize plugs having two or three (or more) prongs. The receptacle includes electrical contacts that are normally in a non-energized or "dead" state, and are only electrically energized or made "live" when a compatible object such as a plug prong is inserted into a receptacle opening associated with a different contact. In this way, prongs of a proper electrical plug may be inserted into the receptacle openings and cause the internal electrical contacts to essentially be "switched on" just before or as the prongs establish contact with the electrical contacts. Because each prong causes only a different contact to be energized, and has no effect on the state (live or dead) of its own contact, insertion of a single object into a single receptacle opening will not result in electrical current flowing to the single object. Because the tamper resistant electrical outlet does not block access to electrical contacts in the manner of an outlet equipped with a shutter mechanism, the plug insertion forces are typically lower than for an outlet with a shutter mechanism, and there is comparatively little to distinguish the tamper resistant outlet from a traditional outlet based on the tamper resistant outlet's manner of operation and its outward appearance.

Figure 1:
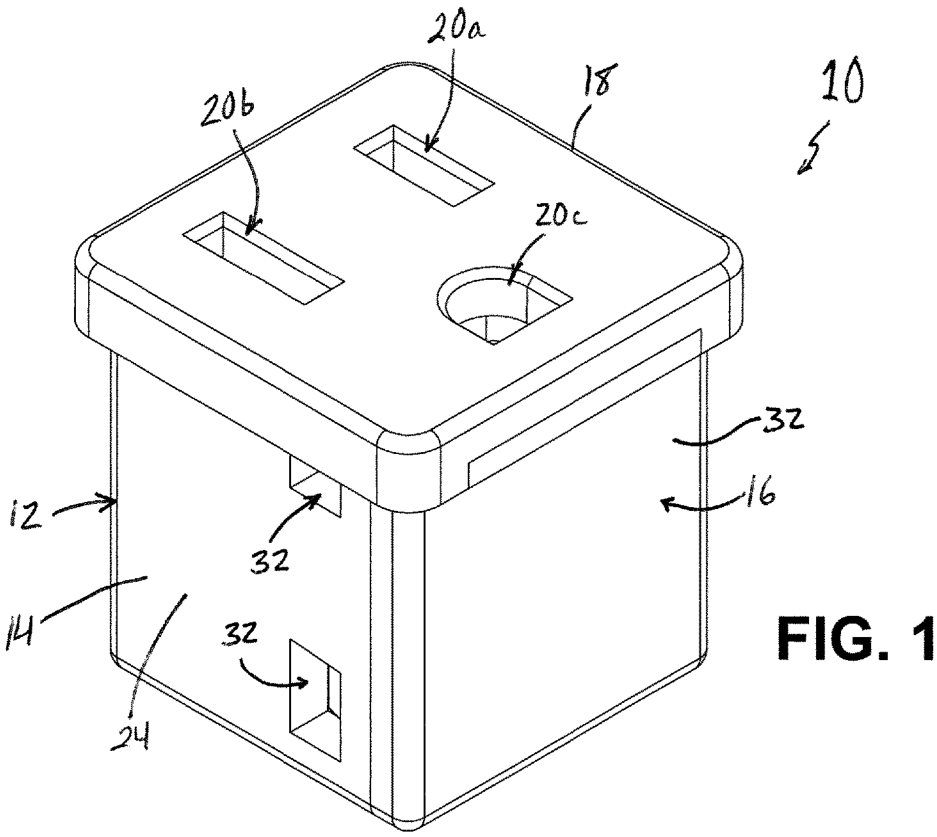
FIG. 1 is a front perspective view of a tamper resistant electrical outlet in accordance with the present invention.
Figure 2:
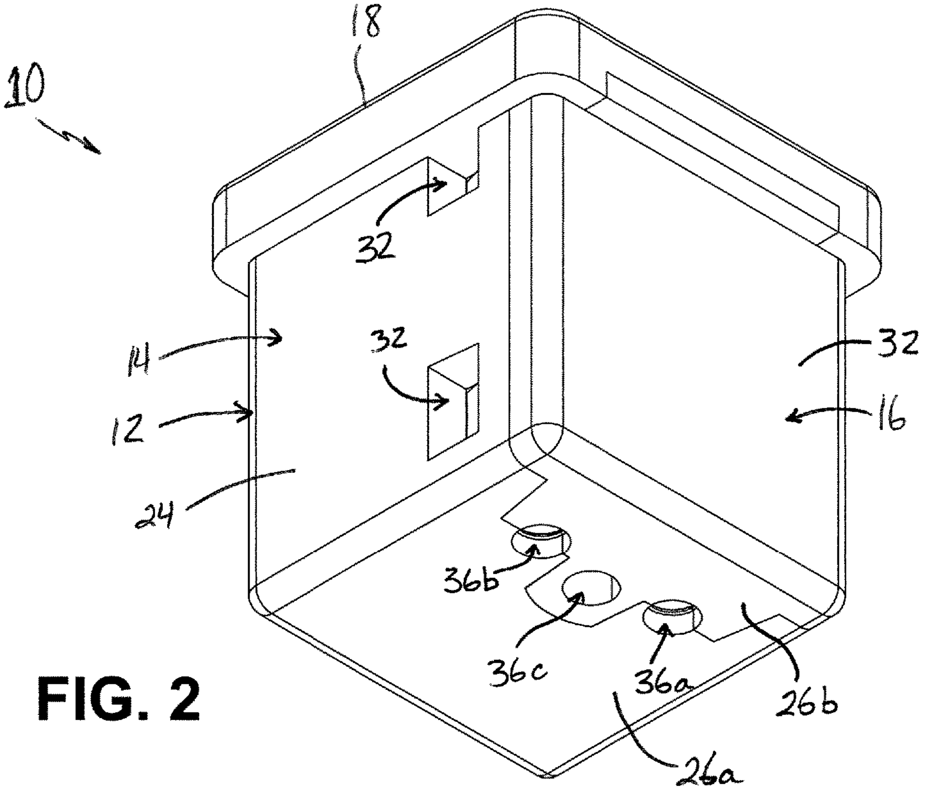
FIG. 2 is a rear perspective view of the electrical outlet of FIG. 1.
Figure 4:
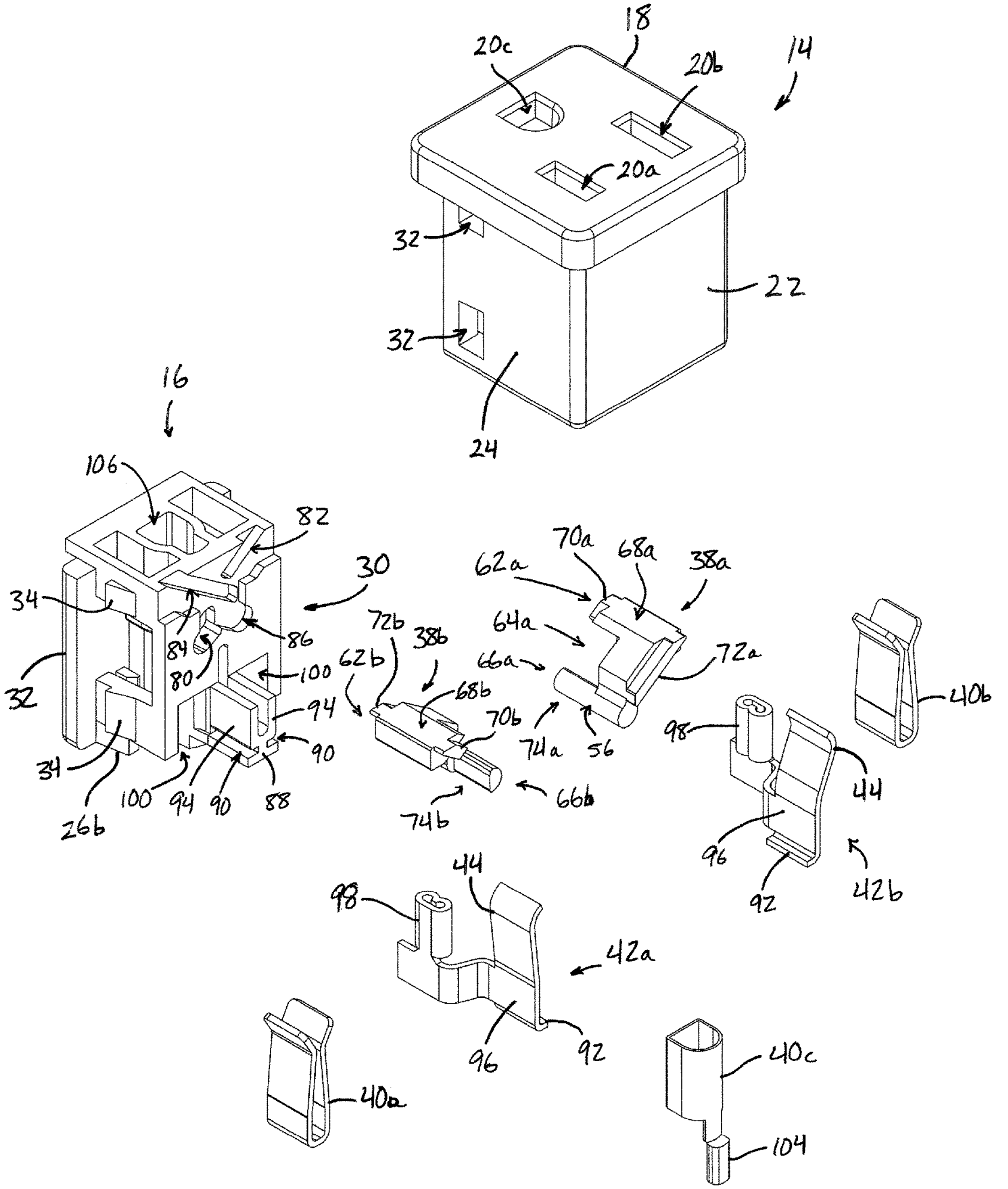
FIG. 4 is an exploded view of the tamper resistant electrical outlet of FIG. 1.
Figure 5:
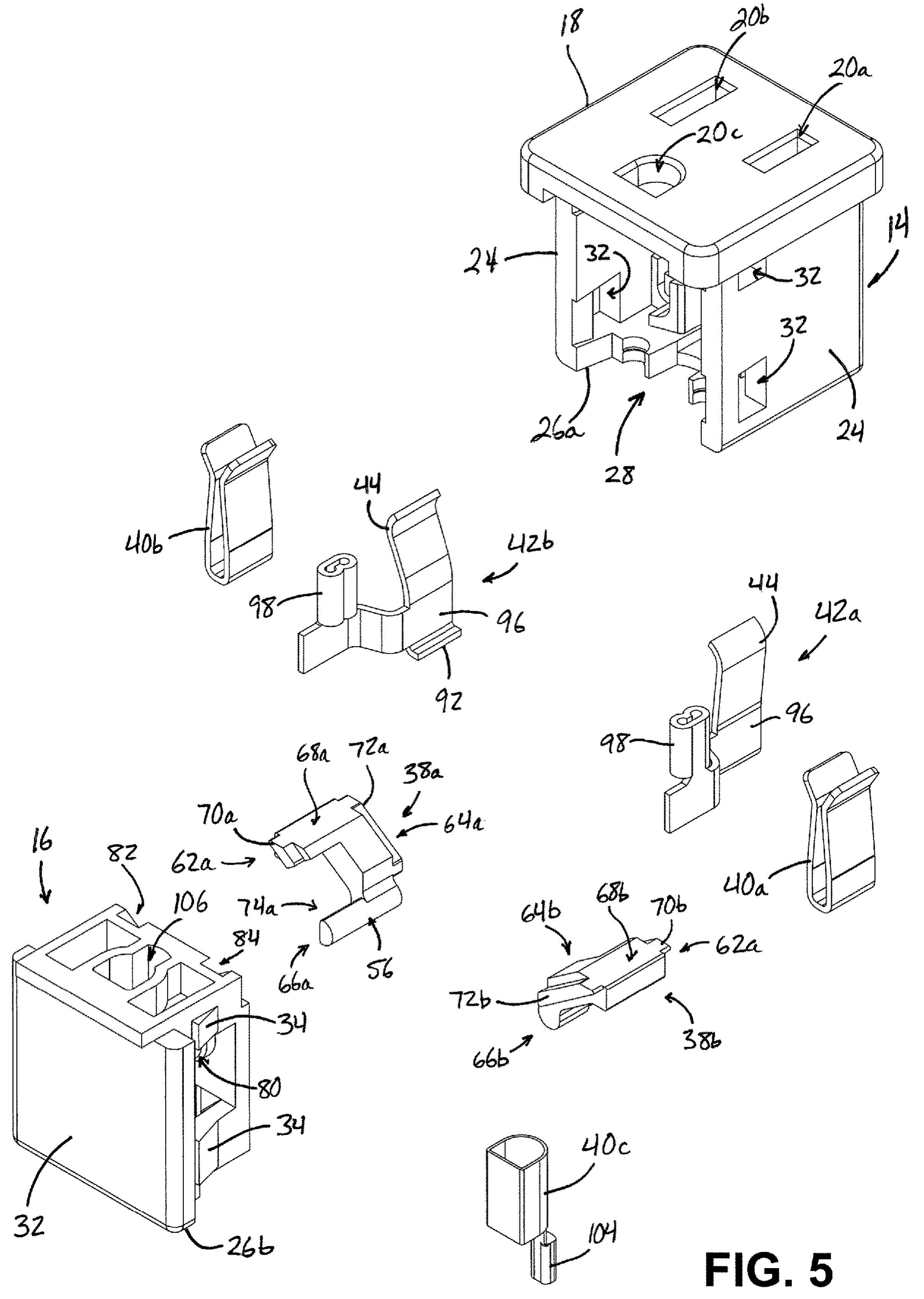
FIG. 5 is another exploded view of the tamper resistant electrical outlet of FIG. 1, rotated about 90 degrees from the view of FIG. 4.

Referring now to the drawings and illustrative embodiments depicted therein, a tamper resistant electrical receptacle or outlet 10 includes a receptacle body 12 that, in the illustrated embodiment of FIGS. 1, 2, and 4-6D, is a two-piece body including a main body 14 and an insert body 16 that is partially received in the main body 14. Main body 14 includes a front face 18 that defines a plurality of receptacle openings 20*a*-*c* (line 20*a*, neutral 20*b*, ground 20*c*), and further includes a top wall 22 and opposite side walls 24 that extend rearwardly from face 18, plus a main rear wall portion 26*a* that closes the ends of top wall 22 and side walls 24 to form an interior cavity 28 as shown in FIG. 5. Insert body 16 includes an interior or insert portion 30 that is received in interior cavity 28 of main body 14, a bottom wall 32 that cooperates with front face 18 and side walls 24 to enclose interior cavity 28 (see FIG. 2), and an insert rear wall portion 26*b* that meets main rear wall portion 26*a* to enclose a rear end of receptacle body 12. Side walls 24 each define a pair of openings 32 for receiving respective latch tabs 43 along the insert portion 30 of the insert body 16. Latch tabs 34 engage the openings 32 during assembly of receptacle body 12 to secure insert body 16 to main body 14 without need for additional fasteners. Referring to FIG. 2, the insert rear wall portion 26*b* cooperates with main rear wall portion 26*a* to define a line wire opening 36*a* and a neutral wire opening 36*b*, and insert rear wall portion 26*b* further defines a ground wire opening 36*c*.

Also inside the interior cavity 28 are a pair of actuators including a line actuator 38*a* and a neutral actuator 38*b* (FIGS. 4-6D), a set of three receptacle contacts including a line receptacle contact 40*a*, a neutral receptacle contact 40*b*, and a ground receptacle contact 40*c*, and a pair of live contacts including a live line contact 42*a* and a live neutral contact 42*b*. In their default or non-engaged positions of FIGS. 3A and 6A, with no objects inserted through receptacle openings 20*a*, 20*b*, there is no electrical contact established between receptacle contacts 40*a*, 40*b* and live contacts 42*a*, 42*b*. Therefore, even when live contacts 42*a*, 42*b* are energized, receptacle contacts 40*a*, 40*b* are not energized when no objects are inserted through receptacle openings 20*a*, 20*b*. As will be described in more detail below, line actuator 38*a* is operable to move a forward contact portion 44 of live line contact 42*a* in an outboard direction and into electrical contact with line receptacle contact 40*a*, in response to insertion of an object through the neutral receptacle opening 20*b* (FIG. 6C). Likewise, neutral actuator 38*b* is operable to move a forward contact portion 44 of neutral line contact 42*b* in an outboard direction and into electrical contact with neutral receptacle contact 40*b*, in response to insertion of an object through the line receptacle opening 20*a* (FIG. 6B).

Figure 3A:
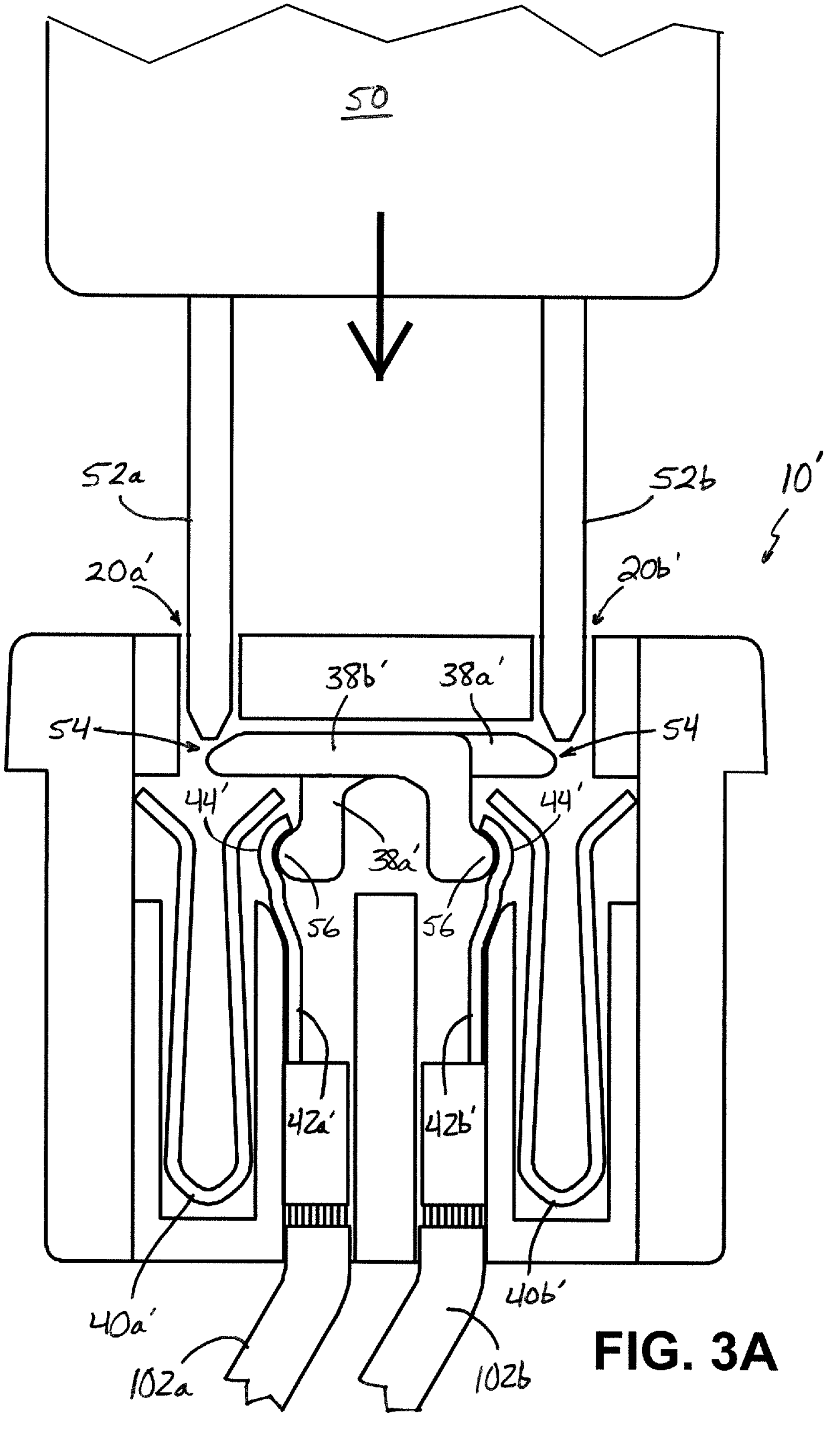
FIGS. 3A-3C are side sectional views of another tamper resistance electrical outlet in accordance with the present invention, depicting the progressive simultaneous insertion of two plug prongs into respective outlet openings.
Figure 3B:
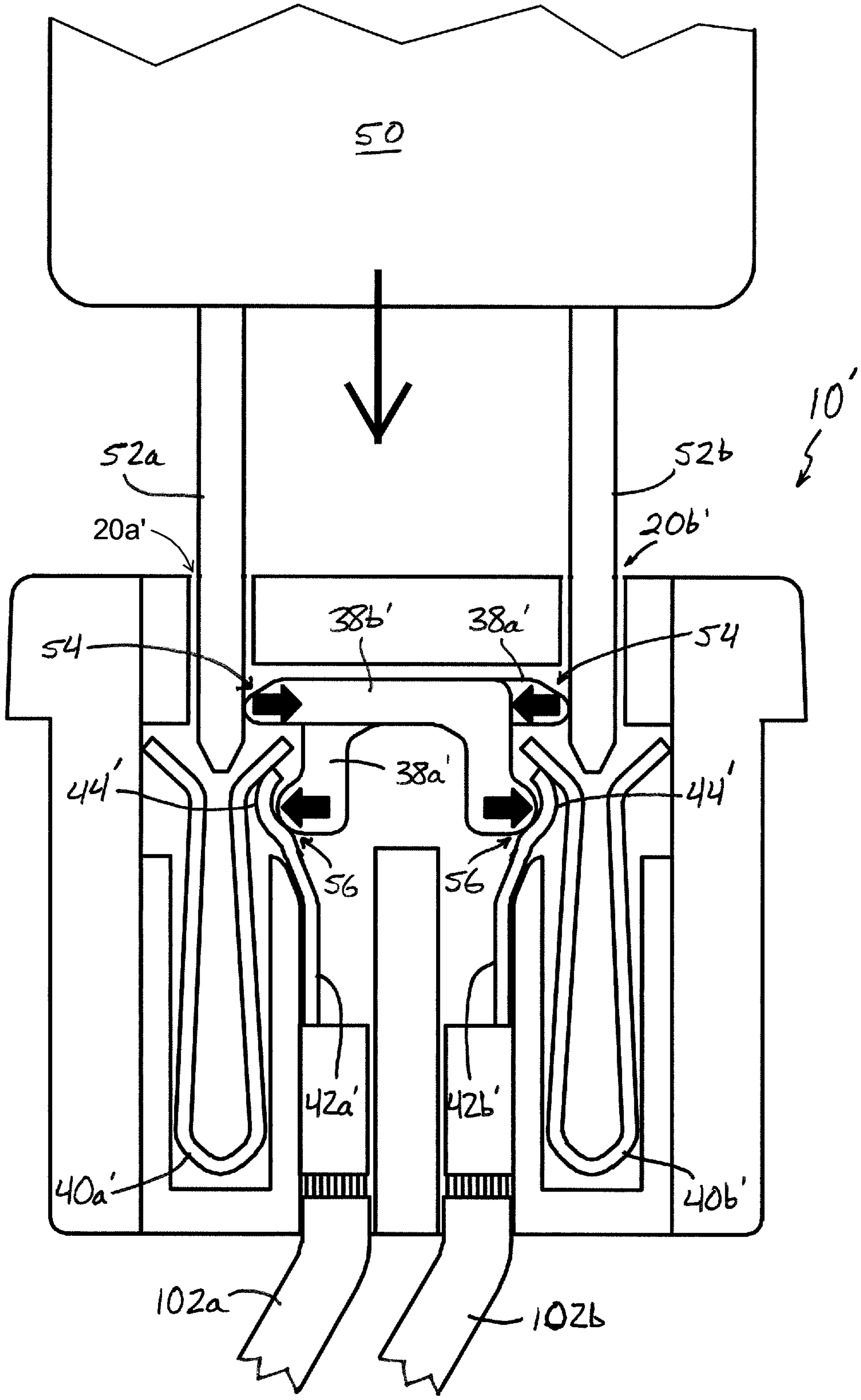
Figure 3C:
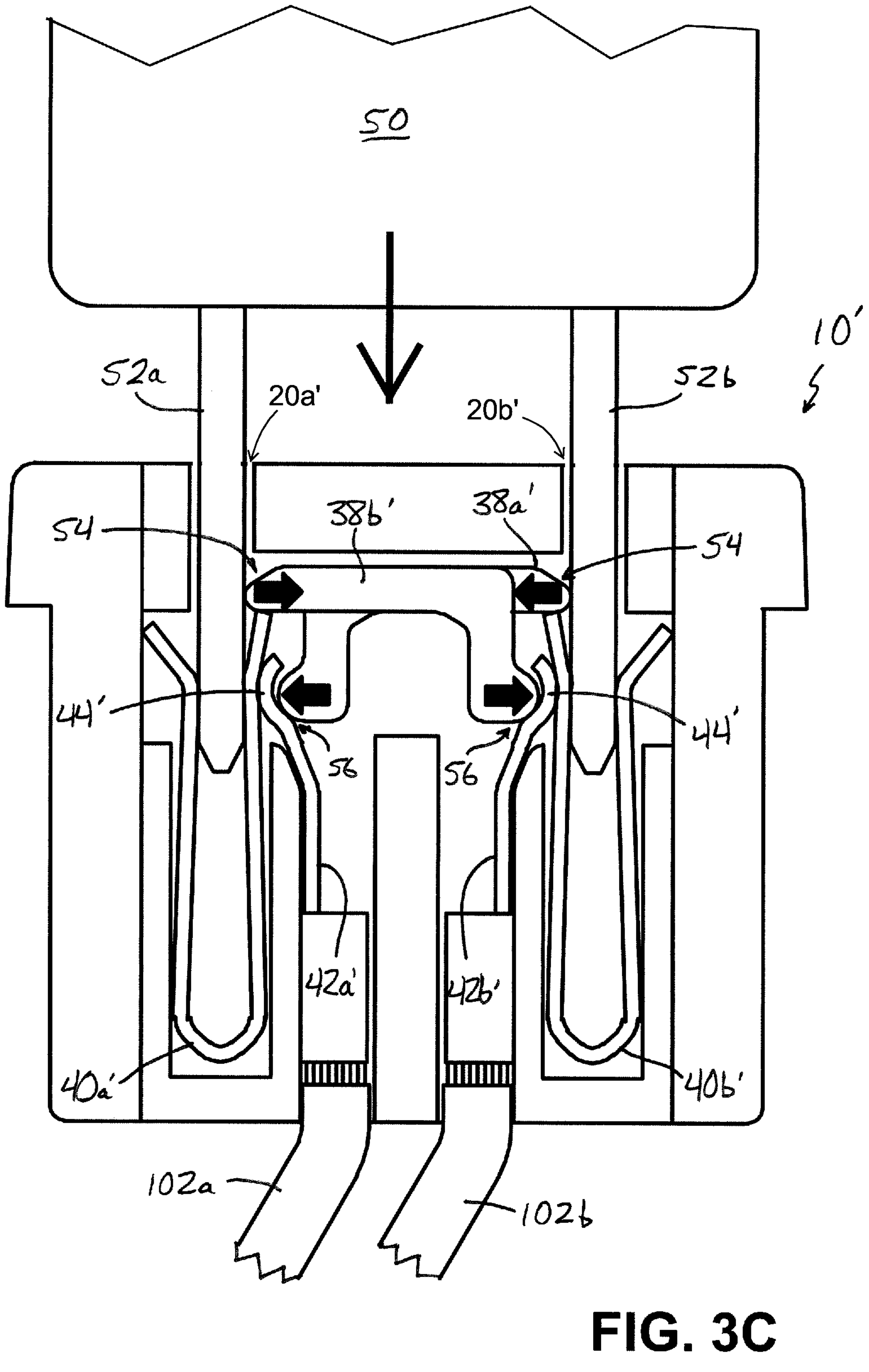

Referring to the simplified drawings of FIGS. 3A-3C, in which simplified components are illustrated using reference numerals corresponding to those above, but with the addition of a "prime" (') suffix, the operation of a simplified tamper resistant electrical outlet 10' can be readily understood. An electrical plug 50 has a blade-type line prong 52*a* and a blade-type neutral prong 52*b*, which are compatible for insertion into the line receptacle opening 20*a'* and neutral receptacle opening 20*b'*, respectively. The line actuator 38*a'* and neutral actuator 38*b'* are mounted behind front face 18', each actuator having an upper tip portion 54 that extends at least partly into alignment with the opposite receptacle opening 20*a'* or 20*b'*. That is, the tip portion 54 of line actuator 38*a'* extend partly into the pathway defined by neutral receptacle opening 20*b'* and the tip portion 54 of neutral actuator 38*b'* extends partly into the pathway defined by line receptacle opening 20*a'*, such as shown in FIG. 3A. Each actuator 38*a'*, 38*b'* also has a rearward actuation nose 56 that is located adjacent and inboard of the forward contact portions 44' of the respective live contacts 42*a'*, 42*b'*.

In the simplified illustrated embodiment of FIGS. 3A-3C, the actuators' upper tip portions 54 have sloped surfaces at their outboard ends, so that actuators 38*a'*, 38*b'* will be urged out of their default positions (FIG. 3A) and toward their actuated positions (FIGS. 3B and 3C) upon insertion of prongs 52*a*, 52*b*. Movement of line actuator 38*a'* due to insertion of neutral prong 52*b* through neutral receptacle opening 20*b'* urges the line actuator's rearward actuation nose 56 outboard (indicated with left-pointing arrows in FIGS. 3B and 3C), thus pushing the forward contact portion 44 of live line contact 42*a'* against line receptacle contact 40*a'* to energize it. Likewise, movement of neutral actuator 38*b'* due to insertion of line prong 52*a* through line receptacle opening 20*a*' urges the neutral actuator's rearward actuation nose 56 outboard (indicated with right-pointing arrows in FIGS. 3B and 3C), thus pushing the forward contact portion 44 of live neutral contact 42*b*' against neutral receptacle contact 40*b*' to energize it. Upon removal of prongs 52*a*, 52*b*, the live contacts 42*a*', 42*b*' act like leaf springs by returning to their default positions of FIG. 3A, thus disengaging from the respective receptacle contacts 40*a*', 40*b*' and urging actuators 38*a*', 38*b*' back to their neutral positions.

It will be appreciated that the simplified sliding movements of actuators 38*a*', 38*b*', which need only move a short distance in one direction, and which do not tilt or lock to block access to the receptacle contacts 40*a*', 40*b*', allows for less resistance to movement as compared to access-blocking mechanisms that typically tilt, lock, and slide in different directions while engaging and disengaging different surfaces. While outlet receptacles disclosed herein allow for insertion of a small foreign object into one receptacle opening and then engaging the corresponding receptacle contact with the foreign object, that receptacle contact will not become energized unless another foreign object is simultaneously inserted sufficiently far into the other receptacle opening to push the first opening's live contact into engagement with the corresponding receptacle contact. In this manner, the electrical outlet 10 is made tamper-resistant.

Referring once again to FIGS. 4-6D, actuators 38*a*, 38*b* are shown to have more complex shapes than the actuators 38*a*', 38*b*' of FIGS. 3A-3C. Rather than relying on upper tip portions 54 with ramped surfaces that cause lateral movement upon engagement by a plug prong 52*a* or 52*b*, as described above with respect to the simplified drawings of FIGS. 3A-3C, actuators 38*a*, 38*b* have planar front surfaces 60*a*, 60*b* that substantially obstruct the respective receptacle openings 20*b*, 20*a* (i.e., front surface 60*a* obstructs opening 20*b*, and front surface 60*b* obstructs opening 20*a*). Despite these obstructions, actuators 38*a*, 38*b* give little resistance to sliding diagonally rearwardly and laterally away from the receptacle openings 20*b*, 20*a* that they normally obstruct, such that users inserting a proper plug 50 will find little difference between the insertion forces required to insert the prongs 52*a*, 52*b* into tamper resistant electrical outlet 10 as compared to a conventional (not tamper resistant) electrical outlet.

Actuators 38*a*, 38*b* are functionally similar to one another, but with minor structural differences that allow for intersecting travel paths without interference, so that the actuators can operate independently of one another. Referring to FIGS. 4 and 5, line actuator 38*a* is unitarily formed with a forward portion 62*a* that is normally (default) positioned just rearwardly of the neutral receptacle opening 20*b*, a diagonal middle portion 64*a* that extends rearwardly and laterally inboard from forward portion 62*a*, and a post-like rearward portion 66*a* at a rearward end of the diagonal middle portion 64*a*. Forward portion 62*a* includes a generally planar forward surface 68*a* and a pair of guide tabs including a shorter guide tab 70*a* and a longer guide tab 72*a*. Guide tabs 70*a*, 72*a* are slidingly received in respective diagonal channels defined in the main body 14 and/or the insert body 16, as will be described below. The post-like rearward portion 66*a* and forward portion 62*a* have free ends that extend downwardly (to the upper-left in FIG. 4, or to the lower-left in FIG. 5) from diagonal middle portion 64*a*. Rearward portion 66*a* includes the actuation nose 56, which is a convex partial-cylindrical surface of rearward portion 66*a* that is designed to engage the forward contact portion 44 of live line contact 42*a*.

Neutral actuator 38*b* is constructed similarly to line actuator 38*a*, including a forward portion 62*b* that is normally (default) positioned just rearwardly of the line receptacle opening 20*a*, a diagonal middle portion 64*b* that extends rearwardly and laterally inboard from forward portion 62*b*, thus cooperating with the line actuator's middle portion 64*a* to form an X-like shape as shown in FIGS. 6A-6D, and a post-like rearward portion 66*b* at a rearward end of the diagonal middle portion 64*b*. Forward portion 62*b* includes a generally planar forward surface 68*b* and a pair of guide tabs including a shorter guide tab 70*b* and a longer guide tab 72*b*, the latter being slidingly received in respective diagonal channels defined in the main body 14 and/or the insert body 16. The post-like rearward portion 66*b* and forward portion 62*b* have free ends that extend upwardly (to the lower-right in FIG. 4, or to the upper-right in FIG. 5) from diagonal middle portion 64*b*. Rearward portion 66*b* includes the actuation nose 56 that selectively engages forward contact portion 44 of neutral line contact 42*b*.

Figure 6A:
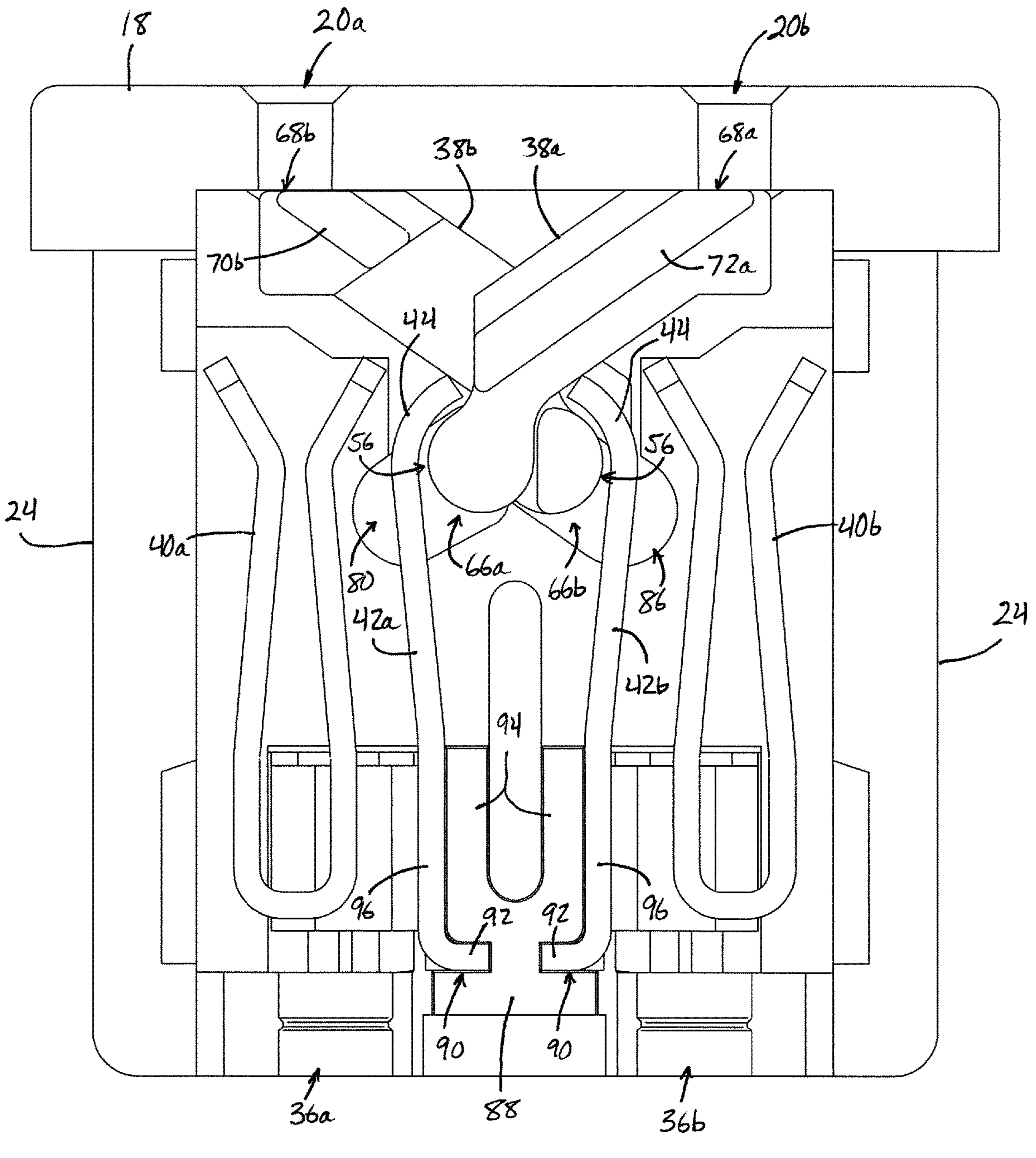
FIG. 6A is a side sectional view of the tamper resistant electrical outlet of FIG. 1.
Figure 6B:
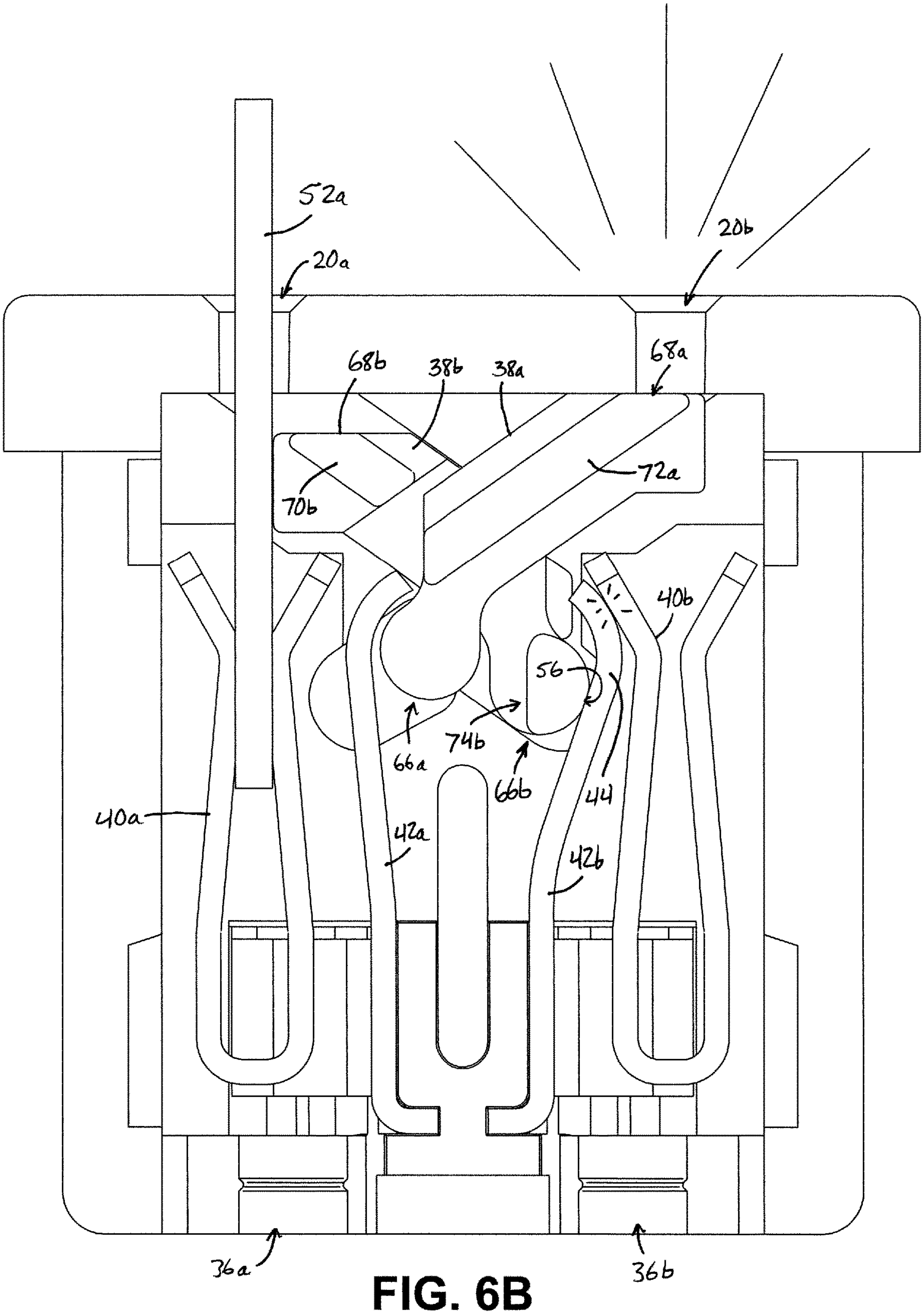
FIG. 6B is another side sectional view of the tamper resistant electrical outlet of FIG. 1, shown with a single prong inserted into a left receptacle opening and engaging a left electrical contact while energizing only the right electrical contact.
Figure 6C:
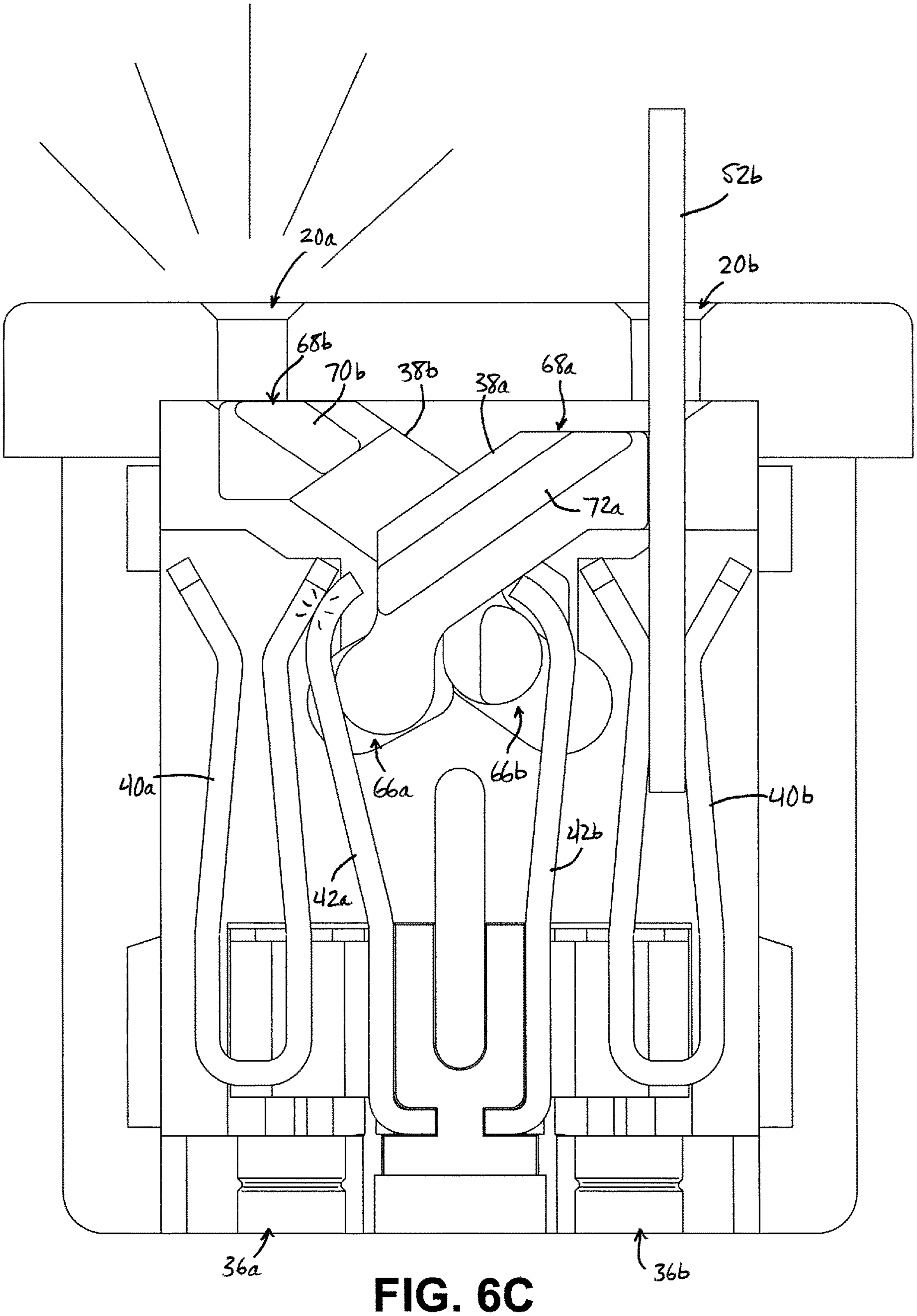
FIG. 6C is another side sectional view of the tamper resistant electrical outlet of FIG. 1, shown with a single prong inserted into a right receptacle opening and engaging a right electrical contact while energizing only the left electrical contact.

As can be seen in FIGS. 4 and 6A-6B (for neutral actuator rearward portion 66*b*) and in FIG. 5 (for line actuator rearward portion 66*a*), the rearward actuator portions 66*a*, 66*b* include partial-cylindrical tip portions 74*a*, 74*b* that allows the rearward portions 66*a*, 66*b* to partially overlap one another when viewed axially in their default positions, such as shown in FIG. 6A. It will be appreciated that the configuration of actuators 38*a*, 38*b* is such that they can be identical to one another and installed facing opposite directions, with each actuator's middle portion 64*a*, 64*b* moving diagonally within a space defined between the free ends of the other actuator's forward and rearward portions. Because the actuators 38*a*, 38*b* are identical, the assembly process is simplified and tooling costs are reduced. Actuators 38*a*, 38*b* are made of electrically non-conductive material that is sufficiently hard to resist wear from frequent engagement by prongs 52*a*, 52*b* of electrical plugs 50, and from sliding movement during operations. For example, many types of injection molded resinous plastics may be satisfactory. Although it is envisioned that actuators 38*a*, 38*b* may be unitarily formed from a single material, it will be appreciated that for abrasion-resistance it may be desirable to form or cover the forward surfaces 68*a*, 68*b* with a harder material, potentially even including conductive metals, which may have desirable properties not available from most resinous plastics, such as higher abrasion resistance, greater hardness, and lower coefficient of friction when engaged by a metal plug prong.

Referring again to FIGS. 4 and 5, partial-cylindrical tip portion 74*a* of line actuator rearward portion 66*a* is received in a diagonal opening 80 formed in insert body 16, and shorter guide tab 70*a* is received in a diagonal slot 82 formed in insert body 16. Another diagonal slot (not shown) is formed by main body 14 inside interior cavity 28 receives longer guide tab 72*a*. Longer guide tab 72*b* of neutral actuator 38*b* is received in another diagonal slot 84 formed in insert body 16, while another diagonal slot (not shown) is formed by main body 14 inside interior cavity 28 to receive shorter guide tab 70*b*. A recess 86 is located adjacent diagonal opening 80 and provides space for rearward portion 66*b* to move. Rearwardly of diagonal opening 80, slots 82, 84, and recess 86, there is a live contact support 88 that defines a pair of rearward slots 90 for receiving rearward legs 92 of live contacts 42*a*, 42*b*, such as shown in FIGS. 4 and 6A-6D. A pair of legs 94 extend forwardly from slots 90 and provide support and electrical insulation for generally planar middle portions 96 of the respective live contacts 42*a*, 42*b*. Each live contact 42*a*, 42*b* includes a respective crimp connector 98 that extends from the planar middle portion 96 and into a respective passageway 100 formed in insert body 16 on either side of live contact support 88. Crimp connectors 98 mechanically and electrically secure to a line conductor 102*a* and a neutral conductor 102*b*, examples of which are illustrated in the simplified views of FIGS. 3A-3C, so that live contacts 42*a*, 42*b* are always energized once connected to their respective conductors 102*a*, 102*b*, which are typically single-strand or multi-strand electrical wires designed to carry 110V or 220V AC electrical current from an electrical mains supply. Ground contact 40*c* includes its own crimp connector 104 that aligns with ground wire opening 36*c*, the ground contact 40*c* being accessible through an opening or bore 106 formed through insert body 16, which opening 106 is aligned with ground receptacle opening 20*c*.

The operation of actuators 38*a*, 38*b* will be understood with reference to the above descriptions of the simplified drawing FIGS. 3A-3C, and with reference to FIGS. 6A-6D and the descriptions that follow. In FIG. 6A live contacts 42*a*, 42*b* are in their default or relaxed or non-actuated state, with no prongs or other objects inserted through line receptacle opening 20*a* or neutral receptacle opening 20*b*. In this configuration, both live contacts 42*a*, 42*b* are spaced well apart from the respective receptacle contacts 40*a*, 40*b* to ensure that receptacle contacts 40*a*, 40*b* are non-energized or "dead" in this configuration. It can also be seen in FIG. 6A that the forward contact portion 44 of each live contact 42*a*, 42*b* is spaced from each actuation nose 56 of the respective actuators 38*a*, 38*b*. Such spacing is not required, but may permit some "play" in the actuators 38*a*, 38*b* when the actuators are not engaged by plug prongs, since the resilient spring-like characteristics of contact portions 44 provide a return force to the actuators' default positions of FIG. 6A. In this default configuration, both live contacts 42*a*, 42*b* can be continuously electrically energized, while neither of the receptacle contacts 40*a*, 40*b* is energized.

Referring now to FIG. 6B, the line prong 52*a* has been inserted sufficiently far into line receptacle opening 20*a* to push neutral actuator 38*b* diagonally so that the actuator's actuation nose 56 has urged the forward contact portion 44 of live neutral contact 42*b* into electrically conductive engagement with neutral receptacle contact 40*b*. This action renders neutral receptacle contact 40*b* live, as indicated by six small lines shown radiating from the point of conductive engagement, and also by five lines shown radiating from neutral receptacle opening 20*b*. With reference to FIG. 6C, the opposite condition of FIG. 6B is shown. That is, in FIG. 6C the neutral prong 52*b* has been inserted sufficiently far into neutral receptacle opening 20*b* to push line actuator 38*a* diagonally so that the actuator's actuation nose 56 has urged the forward contact portion 44 of live line contact 42*a* into electrically conductive engagement with line receptacle contact 40*a*. This action renders line receptacle contact 40*a* live, as indicated by six small lines shown radiating from the point of conductive engagement, and also by five lines shown radiating from line receptacle opening 20*a*. While FIGS. 6B and 6C illustrate different conditions with only single prongs 52*a*, 52*b* inserted into single receptacle openings 20*a*, 20*b*, these drawings also represent the positions that can be assumed by the actuators 38*a*, 38*b* and live contacts 42*a*, 42*b* if a foreign object such as a paperclip or nail were inserted into either one of receptacle openings 20*a*, 20*b*. In each case, the inserted object (represented by prong 52*a* or 52*b*) is not electrically energized despite establishing electrical contact with the respective receptacle contact 40*a* or 40*b*.

Figure 6D:
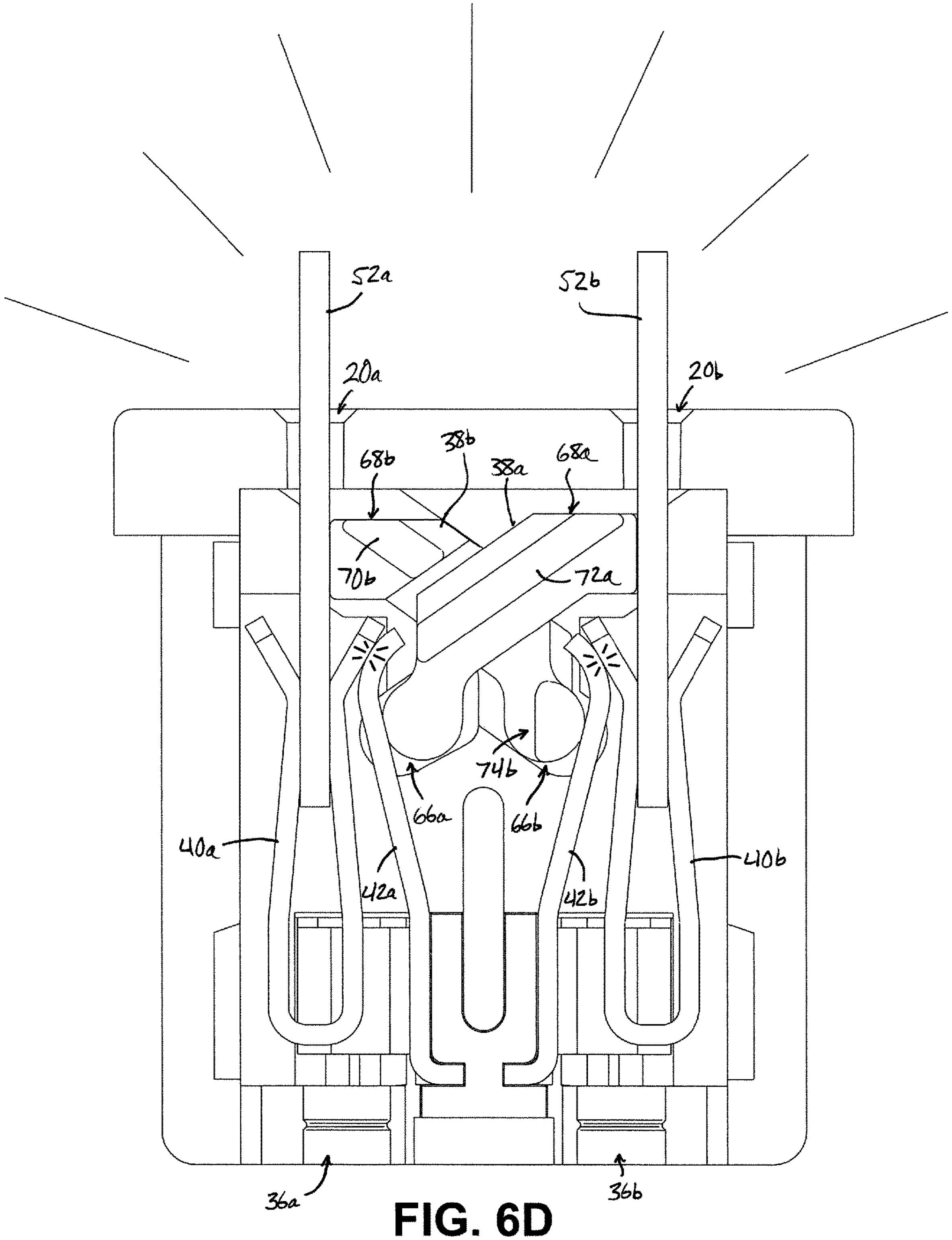
FIG. 6D is another side sectional view of the tamper resistant electrical outlet of FIG. 1, shown with two prongs inserted into respective ones of the left and right receptacle openings while simultaneously engaging and energizing the left and right electrical contacts.

In FIG. 6D there is shown the proper simultaneous insertion of the two plug prongs 52*a*, 52*b* into the respective receptacle openings 20*a*, 20*b*. Because actuators 38*a*, 38*b* operate independently of one another, FIG. 6D is essentially a combination of FIGS. 6B and 6C, demonstrating that there is no conflicting movement of the actuators 38*a*, 38*b* as they both move diagonally from their default positions to their fully actuated positions. Each actuator 38*a*, 38*b* is permitted to freely move in response to insertion of the respective prong 52*b*, 52*a*, and each prong is electrically energized by movement of the respective forward contact portions 44 of live contacts 42*a*, 42*b*. It will be appreciated that the full engagement of receptacle contacts 40*a*, 40*b* by the respective prongs 52*a*, 52*b* will typically force the contacts' arms to spread apart (best shown in FIG. 3C compared to FIGS. 3A and 3B), which forces the inboard arm into tighter or higher-force engagement with the respective forward contact portion 44 of live contact 42*a* or 42*b*. Thus, electrical contact between forward contact portions 44 and receptacle contacts 40*a*, 40*b* is established and enhanced by movement of the respective forward contact portion and inboard arm of the receptacle contact 40*a*, 40*b* toward one another, although it is envisioned that sufficient electrical contact may be established by movement of forward contact portions 44 alone. Upon removal of both prongs 52*a*, 52*b*, the spring-like forward contact portions 44 of live contacts 42*a*, 42*b* force themselves inwardly away from the respective receptacle contacts 40*a*, 40*b* and, at the same time, forward contact portions 44 press rearward actuation noses 56 inboard to urge actuators 38*a*, 38*b* forwardly to their default positions of FIG. 6D.

It will be appreciated that the principles of the present invention may be incorporated into different styles of electrical outlets, including duplex (two plug) outlets and outlets having different receptacle opening configurations such as a 20-amp configuration or configurations used in countries around the world, for any receptacles having at least two spaced-apart receptacle openings providing access to receptacle contacts of different polarities. Accordingly, the tamper resistant electrical outlet of the present invention provides improved safety by maintaining the internal receptacle contacts in a non-energized or "dead" state unless an object such as a plug prong is inserted into a different receptacle opening. Thus, a single object inserted through a single receptacle opening can make electrical contact with the internal receptacle contact associated with that opening, and no continuity will be established to a live conductor unless and until a separate insertion takes place in a different opening. Only upon insertion of a second object sufficiently far into a different receptacle opening can the first object be energized, since the second object's insertion though the different opening is needed establishes a connection from the live conductor to the first object. This allows for a tamper-resistant outlet that, to a proper user, operates substantially the same as a conventional outlet, but with enhanced safety by maintaining the internal receptacle contacts in a non-energized state when the outlet is not in use or when a single object is inserted into a single opening.

Changes and modifications in the specifically-described embodiments may be carried out without departing from the principles of the present invention, which is intended to be limited only by the scope of the appended claims as interpreted according to the principles of patent law including the doctrine of equivalents.

The invention claimed is:

1. A tamper resistant electrical outlet comprising:

a receptacle body defining first and second outlet openings;

a receptacle contact mounted in said receptacle body and accessible through said first outlet opening;

a live contact mounted in said receptacle body, wherein in a default position said live contact is spaced apart from said receptacle contact; and an actuator mounted in said receptacle body and configured to urge said live contact away from the default position and into engagement with said receptacle contact to energize said receptacle contact in response to insertion of a prong through said second outlet opening.

2. The electrical outlet of claim 1, wherein said actuator is configured to move said live contact into electrical engagement with said receptacle contact.

3. The electrical outlet of claim 1, wherein said live contact is spaced inboard of said receptacle contact in said receptacle body, and wherein insertion of the prong into engagement with said actuator causes said live contact to move outboard toward said receptacle contact.

4. The electrical outlet of claim 1, comprising:

a second receptacle contact mounted in said receptacle body and accessible through said second outlet opening;

a second live contact mounted in said receptacle body, wherein in a default position said second live contact is spaced apart from said second receptacle contact; and a second actuator mounted in said receptacle body and configured to urge said second live contact away from the default position and into engagement with said second receptacle contact to energize said second receptacle contact in response to insertion of the prong or another prong through said first outlet opening.

5. The electrical outlet of claim 4, wherein said actuators comprise forward portions proximate respective ones of said outlet openings and rearward portions offset laterally and rearwardly of said forward portions, said forward portions configured to be engaged by respective prongs of an electrical plug, and said rearward portions configured to engage said movable portions of respective ones of said live contacts.

6. The electrical outlet of claim 5, wherein said receptacle body defines first and second diagonal tracks that slidingly receive respective portions of said actuators and guide said actuators along respective rearward and laterally inboard paths upon insertion of the respective prongs of the electrical plug through said outlet openings.

7. The electrical outlet of claim 5, wherein said rearward portions of said actuators comprise actuation projections that extend parallel to a front face of said receptacle body, wherein said actuation projections directly engage said movable portions of respective ones of said live contacts.

8. The electrical outlet of claim 4, wherein said live contacts comprise resilient metal and provide a spring force in the direction of the default position when displaced away from the default position by said actuators, and wherein said live contacts are configured to urge said actuators back into at least partial alignment with said outlet openings upon removal of the prong or prongs from said outlet openings.

9. The electrical outlet of claim 4, wherein said actuators are independently movable.

10. A tamper resistant electrical outlet comprising:

a receptacle body defining first and second outlet openings;

first and second receptacle contacts mounted in said receptacle body and aligned with said first and second outlet openings, respectively;

first and second live contacts mounted in said receptacle body, wherein portions of said live contacts are movable with respect to said receptacle contacts, and wherein in a default position said live contacts are spaced apart from said receptacle contacts; and first and second actuators mounted in said receptacle body and configured to selectively urge respective ones of said live contacts toward respective ones of said receptacle contacts;

wherein said first live contact is configured to engage and electrically energize said first receptacle contact in response to insertion of an object through said second outlet opening and into engagement with said first actuator, and said second live contact is configured to engage and electrically energize said second receptacle contact upon insertion of an object through said first outlet opening and into engagement with said second actuator.

11. The electrical outlet of claim 10, wherein said live contacts are spaced inboard of said receptacle contacts in said receptacle body.

12. The electrical outlet of any of claim 11, wherein insertion of electrical plug prongs into engagement with said receptacle contacts causes inboard portions of said receptacle contacts to move inboard toward said live contacts.

13. The electrical outlet of claim 11, wherein said actuators comprise forward portions proximate respective ones of said outlet openings and rearward portions offset laterally and rearwardly of said forward portions, said forward portions configured to be engaged by respective prongs of an electrical plug, and said rearward portions configured to engage said movable portions of respective ones of said live contacts.

14. The electrical outlet of claim 13, wherein said receptacle body defines first and second diagonal tracks that slidingly receive portions of said first and second actuators and guide said actuators along respective rearward and laterally inboard paths upon insertion of the respective prongs through said outlet openings.

15. The electrical outlet of claim 13, wherein said rearward portions of said actuators comprise actuation projections that extend parallel to a front face of said receptacle body, wherein said actuation projections directly engage said movable portions of respective ones of said live contacts.

16. The electrical outlet of claim 13, wherein said live contacts comprise resilient metal and provide a spring force in the direction of the default position when displaced away from the default position by said actuators, and wherein said live contacts are configured to urge said actuators back into at least partial alignment with said outlet openings upon removal of objects from said outlet openings.

17. The electrical outlet of claim 10, wherein said actuators are configured to urge respective ones of said live contacts into electrical engagement with respective ones of said receptacle contacts.

18. The electrical outlet of claim 10, wherein said live contacts are configured for continuous electrical coupling with respective electrical supply conductors, and wherein insertion of prongs of an electrical plug into engagement with said actuators urges said live contacts into electrical engagement with said receptacle contacts.

19. The electrical outlet of claim 10, wherein said actuators are independently movable.

20. A tamper resistant electrical outlet comprising:

a receptacle body defining spaced-apart first and second outlet openings;

a receptacle contact mounted in said receptacle body and continuously accessible through said first outlet opening;

a live contact mounted in said receptacle body, wherein in a default position said live contact does not establish electrical continuity with said receptacle contact; and an actuator mounted in said receptacle body and configured to urge said live contact away from the default position and into electrical continuity with said receptacle contact in response to insertion of a prong through said second outlet opening.

* * * * *